US011076721B2

(12) United States Patent
Gross et al.

(10) Patent No.: US 11,076,721 B2
(45) Date of Patent: Aug. 3, 2021

(54) METHOD AND DEVICE FOR MAKING NUT BUTTER AND NUT MILK

(71) Applicant: Eternal East (HK) Ltd., Hong Kong (CN)

(72) Inventors: Charles Brian Gross, Greeley, CO (US); Nile Robert Fedewa, Ft Collins, CO (US); Leah Nicole Rich, Denver, CO (US); Brian Sullivan Lutz, Denver, CO (US); Peter Schuyler Livingston, Aurura, CO (US); Momo Anna Hayashi, Denver, CO (US)

(73) Assignee: ETERNAL EAST (HK) LTD., Hong Kong (CN)

( * ) Notice: Subject to any disclaimer, the term of this patent is extended or adjusted under 35 U.S.C. 154(b) by 193 days.

(21) Appl. No.: 16/456,159

(22) Filed: Jun. 28, 2019

(65) Prior Publication Data
US 2019/0380538 A1 Dec. 19, 2019

Related U.S. Application Data

(63) Continuation of application No. 15/644,224, filed on Jul. 7, 2017, now Pat. No. 10,334,986.
(Continued)

(51) Int. Cl.
| | |
|---|---|
| *A47J 43/046* | (2006.01) |
| *A47J 43/07* | (2006.01) |
| *A23L 25/00* | (2016.01) |

(52) U.S. Cl.
CPC .......... *A47J 43/0722* (2013.01); *A23L 25/30* (2016.08); *A47J 43/046* (2013.01); *A47J 43/0716* (2013.01); *A23V 2002/00* (2013.01)

(58) Field of Classification Search
CPC .. A47J 43/0722; A47J 43/0716; A47J 43/046; A23L 25/30
(Continued)

(56) References Cited

U.S. PATENT DOCUMENTS

| | | | |
|---|---|---|---|
| 1,951,684 | A | 3/1934 | Wells |
| 2,945,634 | A | 7/1960 | Beck et al. |

(Continued)

FOREIGN PATENT DOCUMENTS

| | | |
|---|---|---|
| CN | 201001611 Y | 1/2008 |
| CN | 101779928 A | 7/2010 |

(Continued)

OTHER PUBLICATIONS

Office action in related European application 17181278.4 dated Jul. 8, 2020.
(Continued)

*Primary Examiner* — Faye Francis
(74) *Attorney, Agent, or Firm* — Polson Intellectual Property Law, PC; Margaret Polson; Christopher Sylvain (57) ABSTRACT

A device for producing nut butter and/or nut milk from nuts. The device includes a base having a motor, an outer container positioned above the base, a mixing container positioned within the outer container, and a cutting device positioned within the mixing container and configured to be driven by the motor during operation. The mixing container has inner sidewalls and at least one screen, the inner sidewalls being substantially vertical and the at least one screen having a plurality of holes particularly sized to allow emulsified nut milk to freely pass therethrough. The cutting device has a central hub and at least two blades, the at least two blades vertically offset and each having a blade tip, with each blade tip positioned a certain radial distance from the
(Continued)

inner sidewalls of the mixing container. A method for producing nut butter and/or nut milk is further described.

20 Claims, 10 Drawing Sheets

Related U.S. Application Data (60) Provisional application No. 62/361,636, filed on Jul. 13, 2016, provisional application No. 62/464,786, filed on Feb. 28, 2017.

(58) Field of Classification Search
USPC .......................................................... 241/92
See application file for complete search history.

(56) References Cited

U.S. PATENT DOCUMENTS

| | | |
|---|---|---|
| 2,985,389 A | 5/1961 | Willems |
| 3,368,800 A | 2/1968 | Barnard |
| 3,566,939 A | 3/1971 | Hubrich |
| D249,441 S | 9/1978 | Fukumoto |
| 4,200,244 A | 4/1980 | Sontheimer |
| 4,325,643 A | 4/1982 | Scott |
| 4,688,478 A | 8/1987 | Williams |
| 4,773,599 A | 9/1988 | Lynch et al. |
| D309,082 S | 7/1990 | Hattle |
| 5,184,783 A | 2/1993 | Hockmeyer et al. |
| 5,405,096 A | 4/1995 | Seol |
| D366,595 S | 1/1996 | Dobson |
| 5,636,923 A | 6/1997 | Nejat-Bina |
| 5,662,032 A | 9/1997 | Baratta |
| D426,744 S | 6/2000 | Wong |
| 6,135,019 A | 10/2000 | Chou |
| 6,153,247 A | 11/2000 | Stoddard |
| 6,595,121 B1 | 7/2003 | Chang Chien |
| 6,837,153 B1 | 1/2005 | Chang Chien |
| D501,628 S | 2/2005 | Feil |
| 7,263,926 B2 | 9/2007 | Chang Chien |
| 7,673,824 B2 | 3/2010 | Stamper, II et al. |
| 7,727,566 B2 | 6/2010 | Rapp et al. |
| D647,365 S | 10/2011 | Audette |
| D651,871 S | 1/2012 | Coursey |
| D660,660 S | 5/2012 | Kim |
| D663,586 S | 7/2012 | Audette |
| D668,115 S | 10/2012 | Potter |
| D700,013 S | 2/2014 | Chu |
| 8,695,490 B2 | 4/2014 | Harris |
| D709,325 S | 7/2014 | Guo |
| 10,045,663 B2 | 8/2018 | Wu |
| 2004/0149148 A1 | 8/2004 | Lee |
| 2006/0018189 A1 | 1/2006 | Chang Chien |
| 2006/0124536 A1 | 6/2006 | Guerrero |
| 2006/0153003 A1 | 7/2006 | Sands |
| 2006/0176770 A1 | 8/2006 | Sands |
| 2011/0011281 A1 | 1/2011 | Allen |
| 2013/0228642 A1 | 9/2013 | Beber |
| 2014/0093637 A1* | 4/2014 | Chang ................. A23L 25/30 426/632 |
| 2014/0117130 A1 | 5/2014 | Conti |
| 2016/0338389 A1* | 11/2016 | Malone ................. A23C 3/031 |
| 2018/0079991 A1* | 3/2018 | Green ................... A23L 25/30 |
| 2018/0338643 A1 | 11/2018 | Hammond |

FOREIGN PATENT DOCUMENTS

| | | |
|---|---|---|
| CN | 201977619 U | 9/2011 |
| CN | 202514555 U | 11/2012 |
| CN | 203647102 U | 6/2014 |
| EP | 0299236 A1 | 1/1998 |
| JP | H03-221016 A | 9/1991 |

OTHER PUBLICATIONS

Owner's manual dated 2006 for Soyabella Model SB-130 automatic soymilk maker and coffee grinder made by Tribest Corporation. 10 pages.

User manual dated 2013 for Oster Designed for Life blenders made by Sunbeam Products, Inc. pp. 1-19.

Instruction and Recipe Booklet dated 2015 for Premier Series 9—Cup Food Processor, DLC-2009M Series, made by Cuisinart. 73 pages.

Owner's manual dated Mar. 20, 2012 for Hamilton Beach Food Processor. pp. 1-12.

Owner's Guide dated Dec. 12, 2006 for Ninja Mega Kitchen System BL770 series sold by Euro-Pro Operating LLC. 24 pages.

Owner's Guide dated Jun. 27, 2012 for Ninja Mega Kitchen System BL772 sold by Euro-Pro Operating LLC. 24 pages.

Owner's manual dated Jan. 18, 2014 for Hamilton Beach Blender. pp. 1-12.

Instruction and Recipe Booklet dated Apr. 29, 2015 for Peanut Butter Maker model NBM400 made by Nostalgia Products. pp. 1-12.

Instruction and Recipe Booklet dated May 2, 2016 for Professional Peanut Butter Maker model PBM500 made by Nostalgia Products. pp. 1-13.

Noha (pseudo-anonymous), "Complete Guide to Making Nut Butters", May 12, 2015, pp. 1-33, XP055463826, retrieved from the Internet URL: <http:ffwww.mattersofthebelly.com/the-magic-of-making-nut-butters/> [retrieved on Mar. 29, 2018]; see also two blades shown in the figures (pp. 9-11), recipe (pp. 18-19).

Office action dated May 8, 2020 in related Chinese application CN 201710571642.0.

* cited by examiner

METHOD AND DEVICE FOR MAKING NUT BUTTER AND NUT MILK

CROSS-REFERENCE TO RELATED APPLICATIONS

This application is a continuation of nonprovisional application Ser. No. 15/644,224 filed Jul. 7, 2017, which claims the benefit of provisional application No. 62/361,636 filed Jul. 13, 2016 and provisional application No. 62/464,786 filed Feb. 28, 2017; the disclosures of each of which are incorporated by reference herein for all purposes.

BACKGROUND

Nut milk is a popular beverage, particularly for people who do not wish to consume dairy for either personal or medical reasons. The vast majority of nut milk is currently sold pre-made in stores. Pre-made nut milks are readily available but keeping the solids in suspension requires adding a lot of additive chemicals, negating many of the health and flavor benefits. While there are numerous nut milks on the market, most have extra ingredients that are often undesirable. For example, some contain tricalcium phosphate, a natural mineral salt that increases the calcium content of almond milk to that of dairy milk. It also contains carrageenan, a naturally occurring family of carbohydrates extracted from red seaweed. It is used to suspend calcium and vitamins, as they would settle at the bottom of containers without this additive. Non-organic nut milks contain ingredients such as gellan gum, used as a thickener and stabilizer, dipotassium phosphate, used in non-dairy creamers to prevent coagulation and xanthan gum, which prevents separation. While these ingredients have all been deemed safe for food use, there is some controversy as to how safe they are. As a result, many people have begun to make their own nut milk. Multiple recipes are easily found online. The process to make nut milk generally includes a 'Nut Milk Bag" which is essentially a fine mesh cheesecloth bag. Making nut milk is also relatively inexpensive. Most recipes require one cup of nuts to every 4-6 cups of water.

There are known methods of producing nut milk fresh either at home or in a small retail location, however these all have numerous disadvantages. The most common method requires soaking the nuts over night in water, draining the water, adding fresh water and nuts to a blender, blending and straining through a staining bag. This is a very messy and time consuming process and much of the nut nutrients and flavor is lost when soaking and draining the over-night soaking water. The soaking is required to soften the nuts so that they will emulsify better in the blender, allowing finer particles to allow for better extraction of the nut nutrients when blended in water. If this step is not preformed there is much more pulp left in the straining bag, meaning less nut nutrients in the finished milk and greater food waste. Regardless of the length of soaking, current methods of manufacturing nut milk in small batches leave left over nut pulp that is not able to be emulsified into the nut milk. Soybella makes a soy milk maker that also has instructions for making nut milk. However, this machine produces the same results as above, with large amount of nut pulp left over and not incorporated into the nut milk.

Further, a way of producing nut butter is by pulverizing nuts in a food processor or blender, either for making nut milk as above or often because the nut butter itself is desired (e.g., in cooking, for use as a spread). However, the known devices do not sufficiently butter the nuts even after running the motor for an extended length of time, instead leaving behind chunks of unbuttered nut pieces. There are also nut butter devices on the market that are aimed at producing nut butter. However, these devices often require the addition of oils to help with the buttering process, as well as often being mostly only capable of buttering roasted nuts and teaching away from using raw nuts. For instance, Nostalgia makes a peanut butter maker that may also be used to butter other types of nuts, but instructs the addition of oil.

What is needed is a method to efficiently produce nut butter and nut milk in small batches with little or no waste of nut pulp, no time-consuming soaking step, and easy cleaning. A single small appliance that allows consumer to perform this method at home is also needed.

The foregoing examples of the related art and limitations therewith are intended to be illustrative and not exclusive. Other limitations of the related art will become apparent to those of skill in the art upon a reading of the specification and a study of the drawings.

SUMMARY

One aspect of the present disclosure is a simple two-step method to create nut milk in small batches. First, nut butter is formed in a small appliance from whole nuts or nut pieces. Once the nut butter is formed, water is added and blended with the nut butter to create nut milk. If needed, the nut milk can be strained to remove any remaining unbuttered nut pieces. Another aspect of the present disclosure is a small appliance that allows a user to quickly turn a chosen amount of nuts into nut milk in two short steps with substantially no leftover nut pulp. Another aspect of the present disclosure is a small appliance that is easy to clean. Another aspect of the present disclosure is a device that allows a user to make nut milk in two steps with minimal or no nut pulp waste. Another aspect of the present disclosure is a device that efficiently butters nuts placed therein in a single step without leftover chunks of nut pieces, and without requiring added oils.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

A small appliance to create nut milk having a mixing container and a cutting device, the cutting device having one or more blades positioned a clearance distance from the inner walls of the mixing container. The area of the mixing container around the blades may be vertical or nearly vertical at least for the height of the cutting device and a short space above. One or more screens may be provided to strain leftover nut skins and any nut pulp that was not ground small enough to go into suspension in the water during a mixing step.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is described in greater detail below with reference to the following figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

It should first be understood that nut butter is a common name for when nuts are ground into a smooth paste that can be spread similar to butter. Peanut butter is the most common form, although peanuts are not a true nut and the peanuts must be roasted to achieve a butter state with current production methods. Of course, nut butter may be made using other types of nuts as well, such as almonds or cashews, among others. Nut butter may be made from raw, roasted, and toasted nuts, typically yielding a ratio of about two cups butter per three cups nuts. In addition to nuts and some legumes (e.g., peanuts), certain seeds may also be buttered in the same fashion, for example sesame seeds, including raw, roasted and toasted seeds. The terms "nut" and "nut butter" are used herein for exemplary purposes in the interest of clear and concise description; no limitation is intended or should be inferred with respect to taxonomically non-nuts that may also be buttered and used for like purposes, as such applications are within the scope of the present disclosure. Unless noted otherwise, the methods and steps described herein for turning nuts into nut butter, and emulsifying nut butter in water to produce nut milk, according to the present disclosure are generally in reference to using about two cups nuts (any type) and eight cups water. This is for illustrative purposes; it being understood that altering the quantities and/or ratio of ingredients may result in different absolute values (e.g., the observed buttering time) compared to the described embodiment, yet still benefit from relative efficiencies according to the present disclosure.

Figure 1:
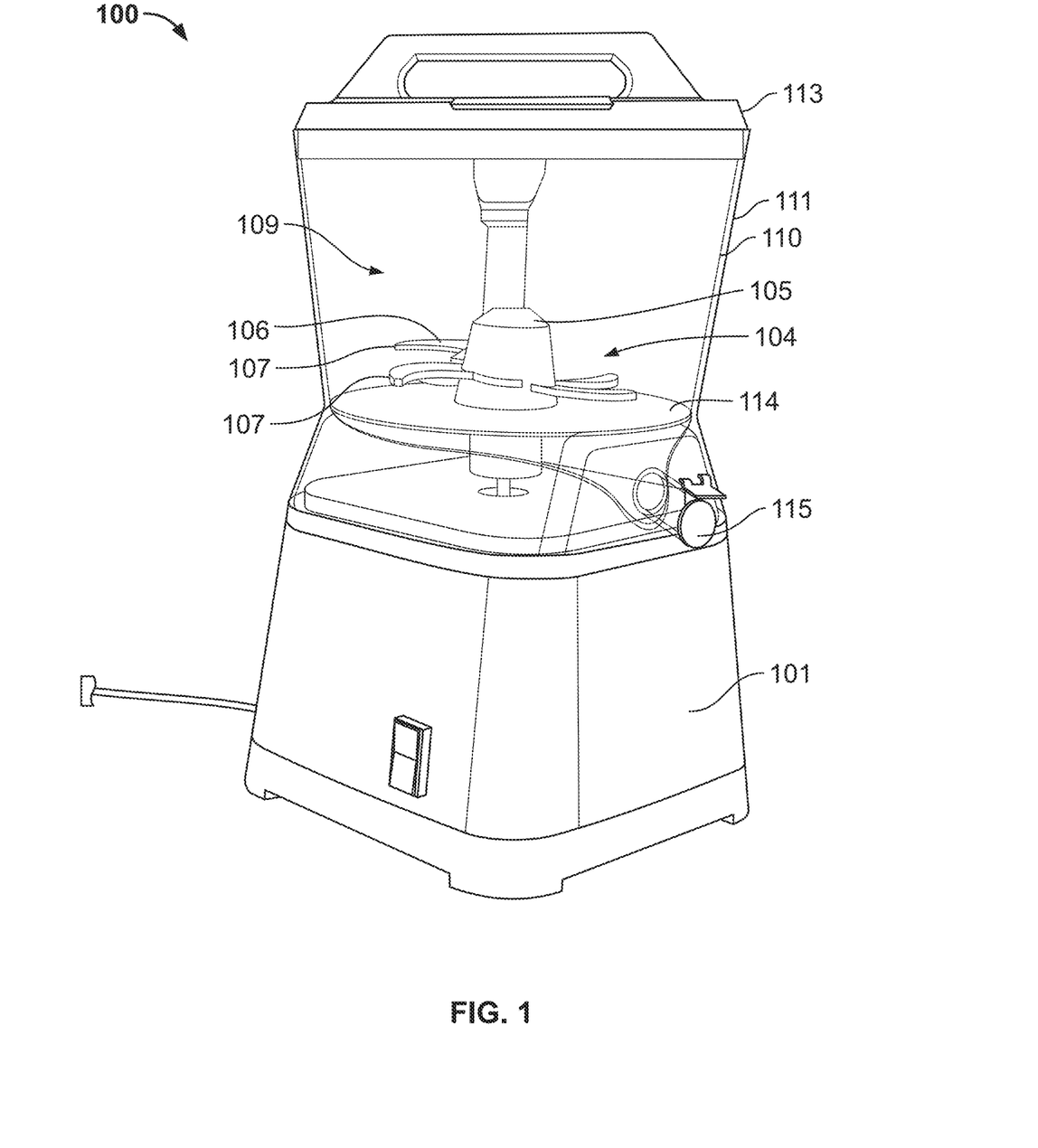
FIG. 1 is a perspective view of a first embodiment of a nut milk device.
Figure 2:
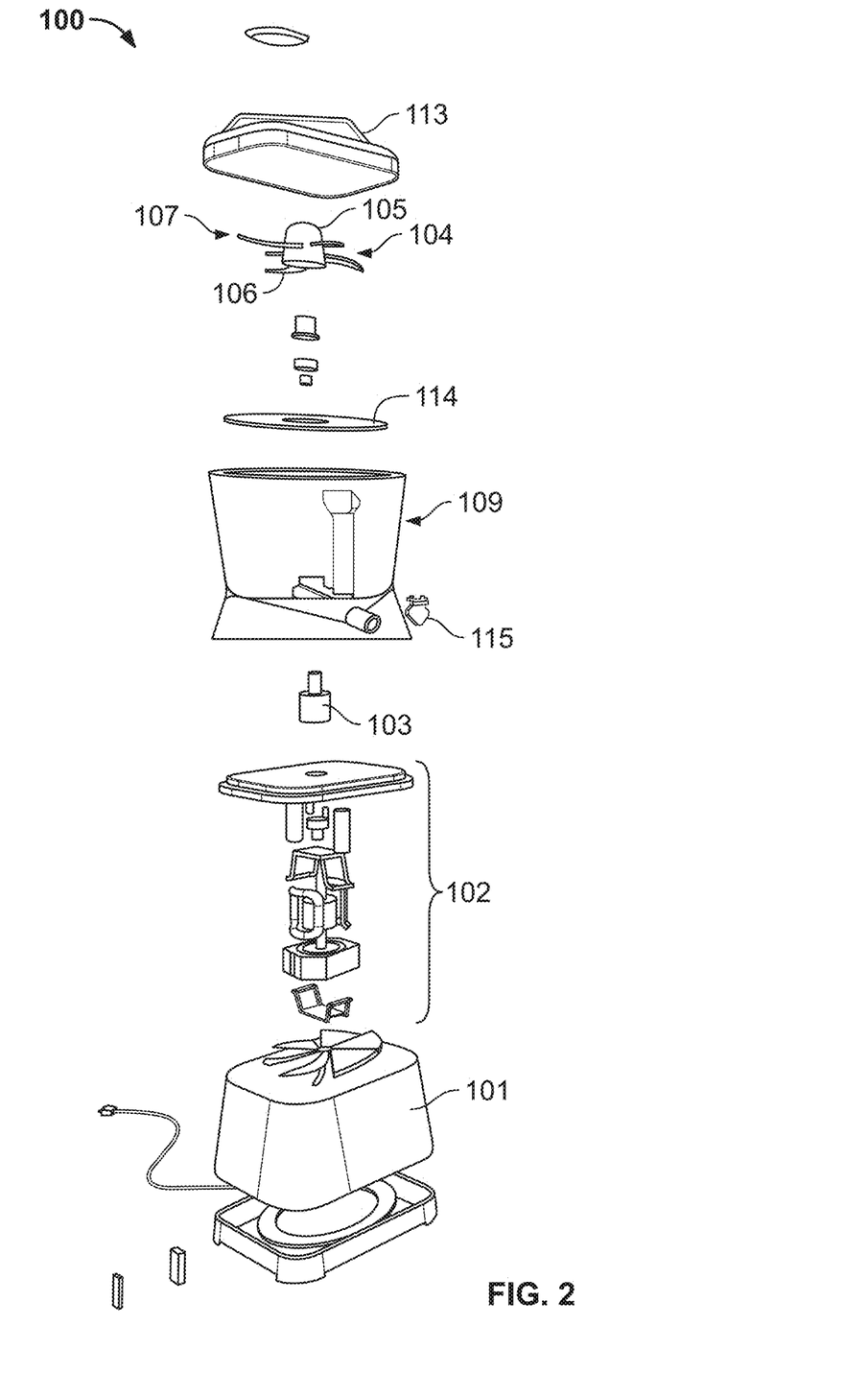
FIG. 2 is an exploded view of the nut milk device of FIG. 1.

Referring to FIGS. 1 and 2, a nut milk maker device 100 is shown as a small appliance which is sized to rest on a countertop or similar surface. A base 101 has a motor 102 which drives a shaft 103. A cutting device 104 is mounted on the shaft 103 and thereby powered by the motor 102. The cutting device 104 comprises a central hub 105 and at least one blade 106 extending outward from the central hub 105. The cutting device 104 of the depicted embodiment has two blades, with the blades positioned by an offset height from each other. Each blade 106 has a blade tip 107 at its end opposite the central hub 105. The central hub 105 may comprise one or more ribs (not shown), as described in more detail below. A mixing container 109 mounts on the base 101 over the shaft 103. The mixing container 109 has inner sidewalls 110 and outer sidewalls 111. A removable lid 113 is provided on top of the mixing container 109. A base plate 114 is provided at the bottom of the mixing container 109 in this embodiment. The base plate 114 is a metal plate with small holes to allow the nut milk to drain through at the end of the process as described below. In a preferred embodiment, the base plate 114 comprises 100 mesh screen (0.0059 inch or 0.149 mm diameter openings), which is small enough to allow emulsified nut milk to drain while also filtering out nut skin pieces and leftover nut pulp, if any. The cutting device 104 is mounted on the shaft 103 inside the mixing container 109 over the base screen 114 as shown.

The inner sidewalls 110 of the mixing container 109 are preferably vertical or mostly vertical in the area around the cutting device 104 to ensure that the nut butter is well formed. The mixing container 109 could expand to hold more liquid above the area where the nut batter is formed, if desired. The blades 106 extend out radially from the central hub 105 toward the inner sidewalls 110. The clearance between the tip 107 of each blade 106 and the inner sidewalls 110 is about 0.10 inches (2.54 mm) in the depicted embodiment. While a radial gap of 0.10 inches (2.54 mm) between the tip 107 of the lower blade and the inner walls 110 of the mixing container 109 is preferred, a range between approximately 0.09 to 0.11 inches (2.29 to 2.79 mm) may also be used. In such an arrangement—where the inner sidewalls 110 in the area of the cutting device 104 are substantially vertical and spaced apart from the blade tips 107 between about 0.09 and 0.11 inches (2.29 to 2.79 mm)—the nuts are effectively pulverized into nut butter, rather than just being chopped into fine pieces and avoiding further processing by the blades. Similarly, it is also advantageous that the bottom blade of the at least one blades 106 is positioned close to the bottom surface of the mixing container 109, which is defined by the base plate 114 in this embodiment. The bottom blade may be spaced between approximately 0.04 and 0.07 inches (1.02 to 1.78 mm) from the bottom surface of the mixing container 109 with effective rendering of nuts into nut butter.

In operation, the nut milk maker 100 is run until the nuts have been fully converted into nut butter. The user then pours water into the mixing container 109 and the nut milk maker 100 is run again to mix the nut butter and water, thereby creating fresh nut milk. The nut milk can be dispensed out of a pour spout 115 positioned under the base plate 114, which retains any particles of the nuts that did not get fully pulverized and emulsified in the water (e.g., nut skins). In the prior art methods about 70-85% by weight remains as unused pulp and skin. By comparison, in the method of the present disclosure almost no pulp is left over, significantly reducing waste and clean up. In one embodiment of a method of using the nut milk making device 100, a chosen amount of nuts (including raw, roasted, or toasted) are first placed in the mixing container 107 and the lid 109 is secured thereon. Then, the motor 102 is turned on for between about 2-12 minutes, or longer for some nuts, until the nuts are turned into nut butter. It should be appreciated that the buttering time varies depending on the type of nut and moisture content of the nut. For instance, soft nuts (e.g., cashews) often butter in less than three minutes. Harder nuts, such as almonds, may butter in more than five minutes or so. However, a high moisture content of the almonds may increase the buttering time to up to 20 minutes. Once the nut butter is formed, then the water is added and the motor is turned on again with the contents blended for another 1-2 minutes or so. In a preferred embodiment, two cups of raw nuts and 8 cups of water yields approximately half gallon of nut milk, with all or nearly all the two cups of nuts liquefied into the nut milk. With the prior art methods, even if there was a comparable yield of the amount of nut milk, the nut milk produced would be more dilute, and therefore have fewer nutrients and less flavor.

Of course, it is understood that there is no requirement to add water to the nut butter to make nut milk. If the user desires, the method and device of the present disclosure can be used in a single step as a nut processor to make nut butter as just described. Then the user can use the nut butter for any number of purposes (e.g., in cooking, as a spread, etc.). No limitation of the present disclosure only pertaining to nut milk is intended, nor should any such limitation be inferred.

Figure 3:
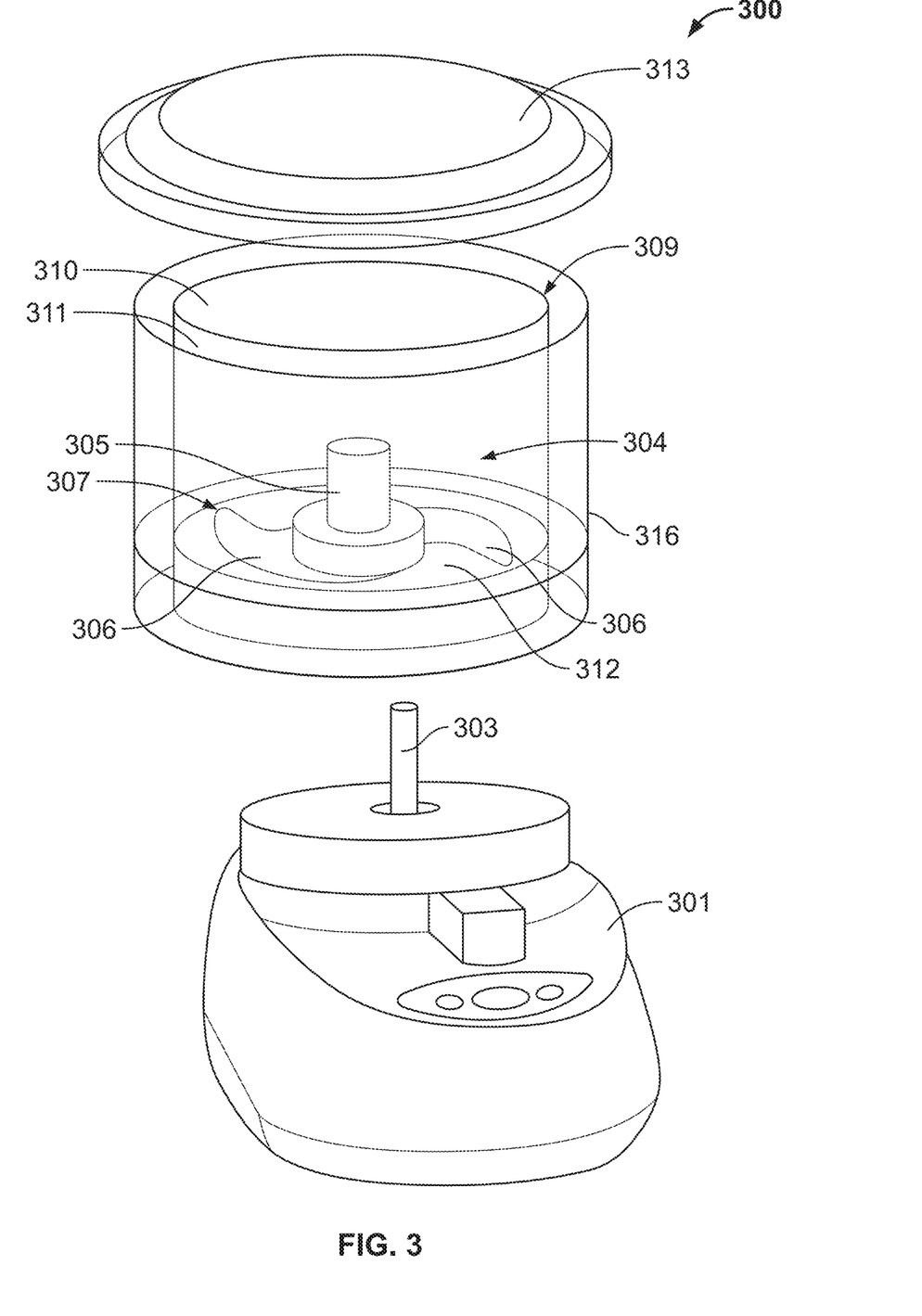
FIG. 3 is an exploded view of a second embodiment of a nut milk device.

Referring next to FIG. 3, another embodiment of a nut milk maker device 300 according to the present disclosure is depicted. A base 301 has a motor (not shown) which powers a cutting device 304 using a shaft 303. The cutting device 304 has at least one blade 306 extending outward from a central hub 305. The depicted embodiment has at least two blades, with the blades positioned by an offset height from each other. A mixing container 309 is provided within an outer container 316, and thus has a smaller diameter than the mixing container 316. Both the mixing container 309 and outer container 316 mount on the base 301. The mixing container has inner sidewalls 310 facing the cutting device 104, outer sidewalls facing the outer container 316, and a bottom surface 312 positioned under the bottom blade of the at least one blades 306. As in the previous embodiment, is important to maintain adequate minimum and maximum distances of the blade tips 307 from the inner sidewalls 310 of the mixing container 309. Therefore, the inner sidewalls 310 of the mixing container 309 may be arranged between about 0.09 to 0.11 inches (2.29 to 2.79 mm) from the blade tips 307, and preferably by a clearance of approximately 0.10 inches (2.54 mm) therebetween. Likewise, the bottom blade may be arranged between approximately 0.04 and 0.07 inches (1.02 to 1.78 mm) from the bottom surface of the mixing container 309. In this embodiment, a screen 314 comprises the entirety of the sidewalls 310, 311 of mixing container 309. The screen 314 is preferably metal with holes sized to prevent non-emulsified nut butter/pieces (if any) and leftover nut skin from passing through into the gap between the mixing container 309 and the outer container 316, but simultaneously allowing fully emulsified nut milk to pass through. For instance, the screen 314 may be a 100 mesh stainless etched screen (0.0059 inch or 0.149 mm diameter openings). In this embodiment, the finished nut milk is poured out the top of the nut milk maker 300 after the lid 313 is removed. Leftover nut particles, if any, remain in the mixing container 309 and are not poured out with the filtered nut milk. Note that the method of using the device and time ranges for each step are roughly the same in all the disclosed embodiments.

Figure 4:
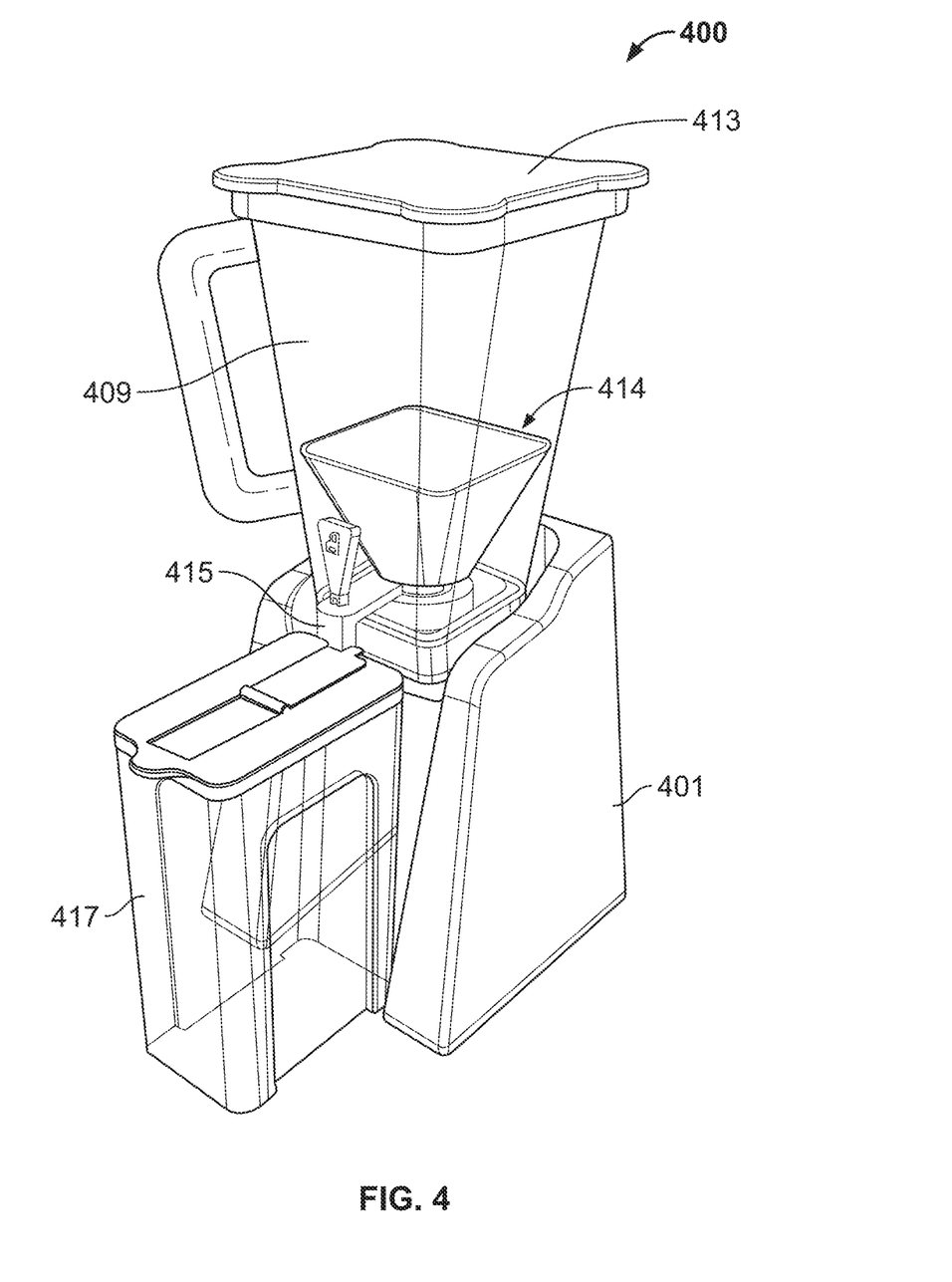
FIG. 4 is a perspective view of a third embodiment of a nut milk device.
Figure 5:
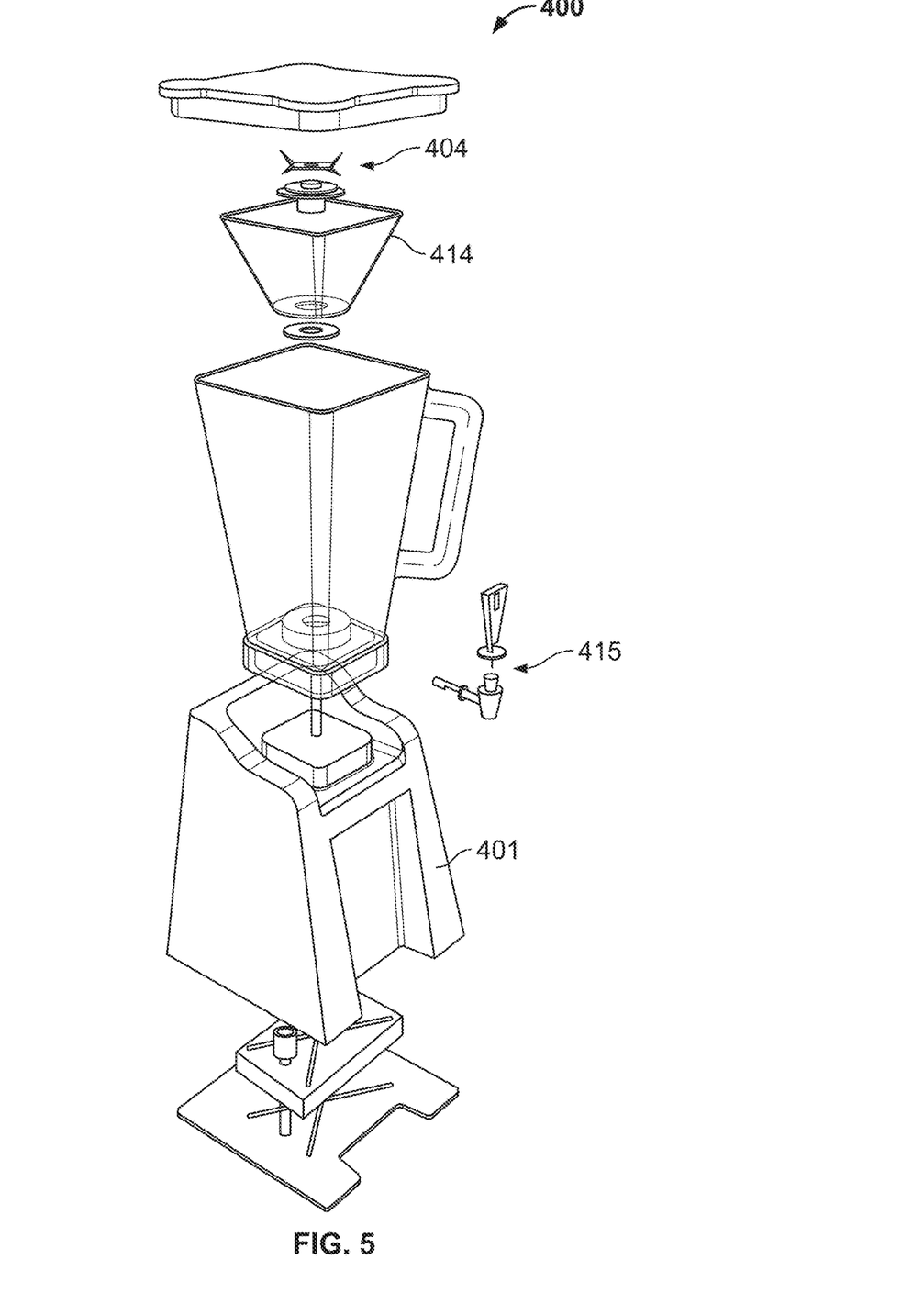
FIG. 5 is an exploded view of the nut milk device of FIG. 4.

As shown in FIGS. 4 and 5, some embodiments of a nut milk maker device 400 according to the present disclosure may include a storage container 417 to hold the finished nut milk. For instance, the base 401 may be appropriately sized and/or otherwise configured to receive the storage container 417, such that the pour spout 415 is positioned to readily transfer the finished nut milk to the storage container 417. Therefore, the base 401 is tall enough for the storage container 417 to fit under the mixing container 409. The nut milk maker 400 also includes a screen 414 positioned within the mixing container 409. In this embodiment, the sides of the screen 414 are appropriately spaced from the blades, in the same manner as the walls of the mixing containers in the previous embodiments, to allow for sufficient pulverization of the nuts into nut butter.

Referring next to FIGS. 6 through 9, a further embodiment of a nut milk maker device 600 according to the present disclosure is shown. As before, a motor drives a shaft (not shown) connected to a cutting device 604 with a mixing container 609. The cutting device comprises a central hub 605 and one or more blades 606 radially extending from the central hub 605. The blades 606 are offset from one another in the vertical direction along the central hub 605. The leading edge of each blade 606 has extensive serrations for pulverizing nuts into nut butter. Each blade 606 has a blade tip 607. The blade tips 607 are positioned between approximately 0.09 to 0.11 inches (2.29 to 2.79 mm), and preferably about 0.10 inches (2.54 mm), from the inner sidewalls 610 of the mixing container 609 (see FIGS. 7 and 8) Likewise, the bottom blade of the one or more blades 606 may be positioned between approximately 0.04 and 0.07 inches (1.02 to 1.78 mm) from the inner bottom surface 612 of the mixing container 609. The central hub 605 may also comprise a plurality of radially-extending ribs 608 which help with mixing (see FIG. 9).

Figure 6:
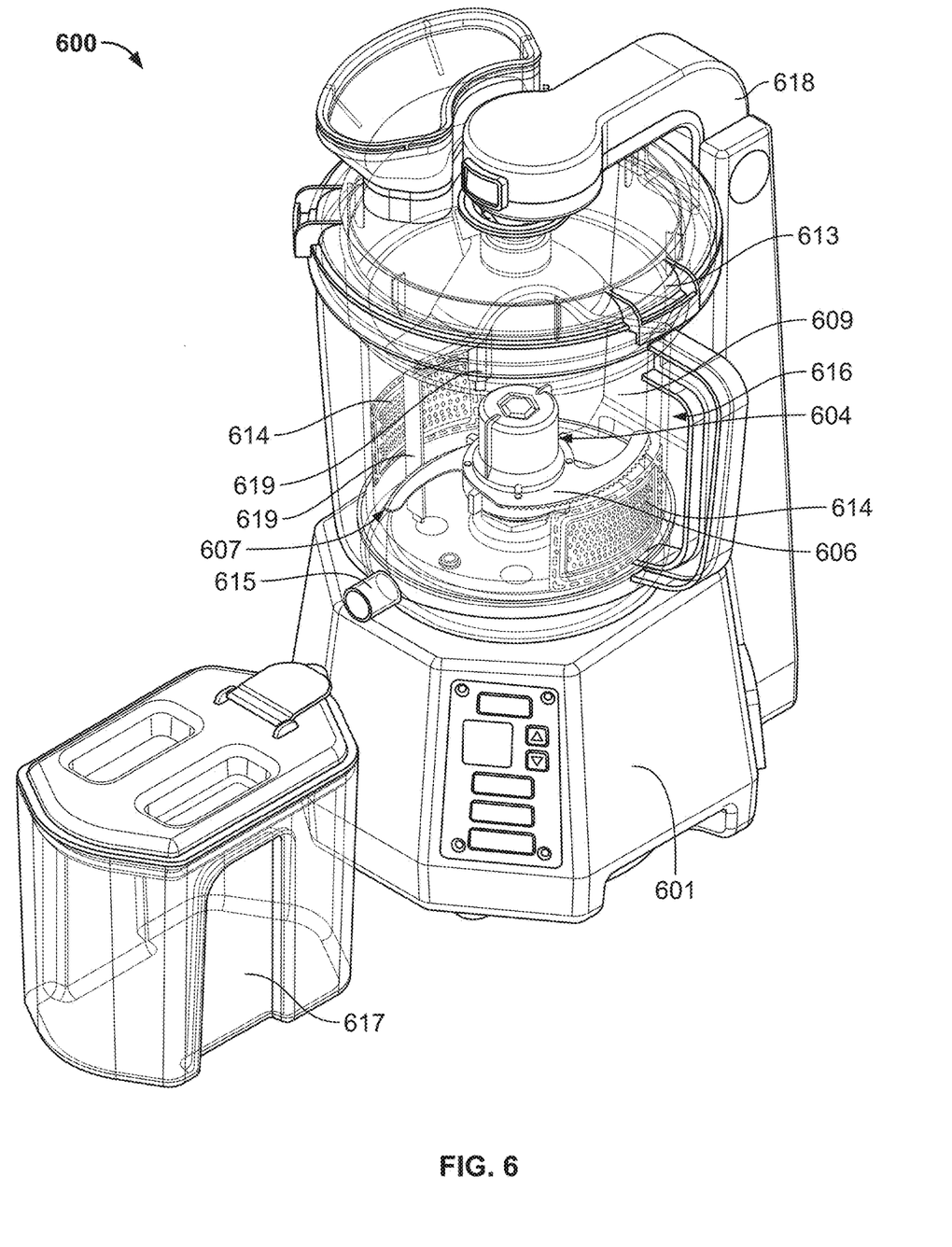
FIG. 6 is a perspective view of a fourth embodiment of a nut milk device.
Figure 7:
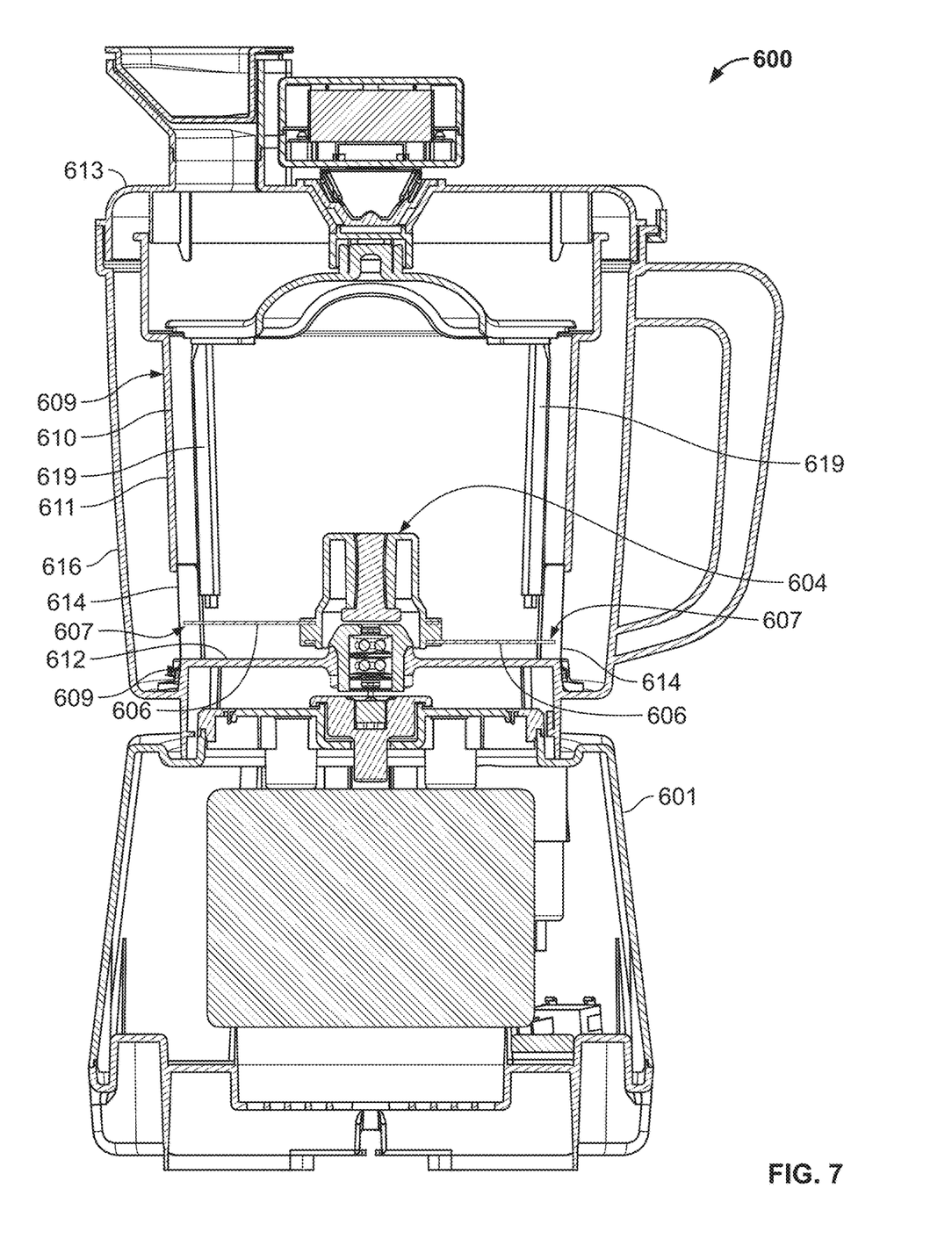
FIG. 7 is a front cross-sectional view of the nut milk device of FIG. 6.
Figure 8:
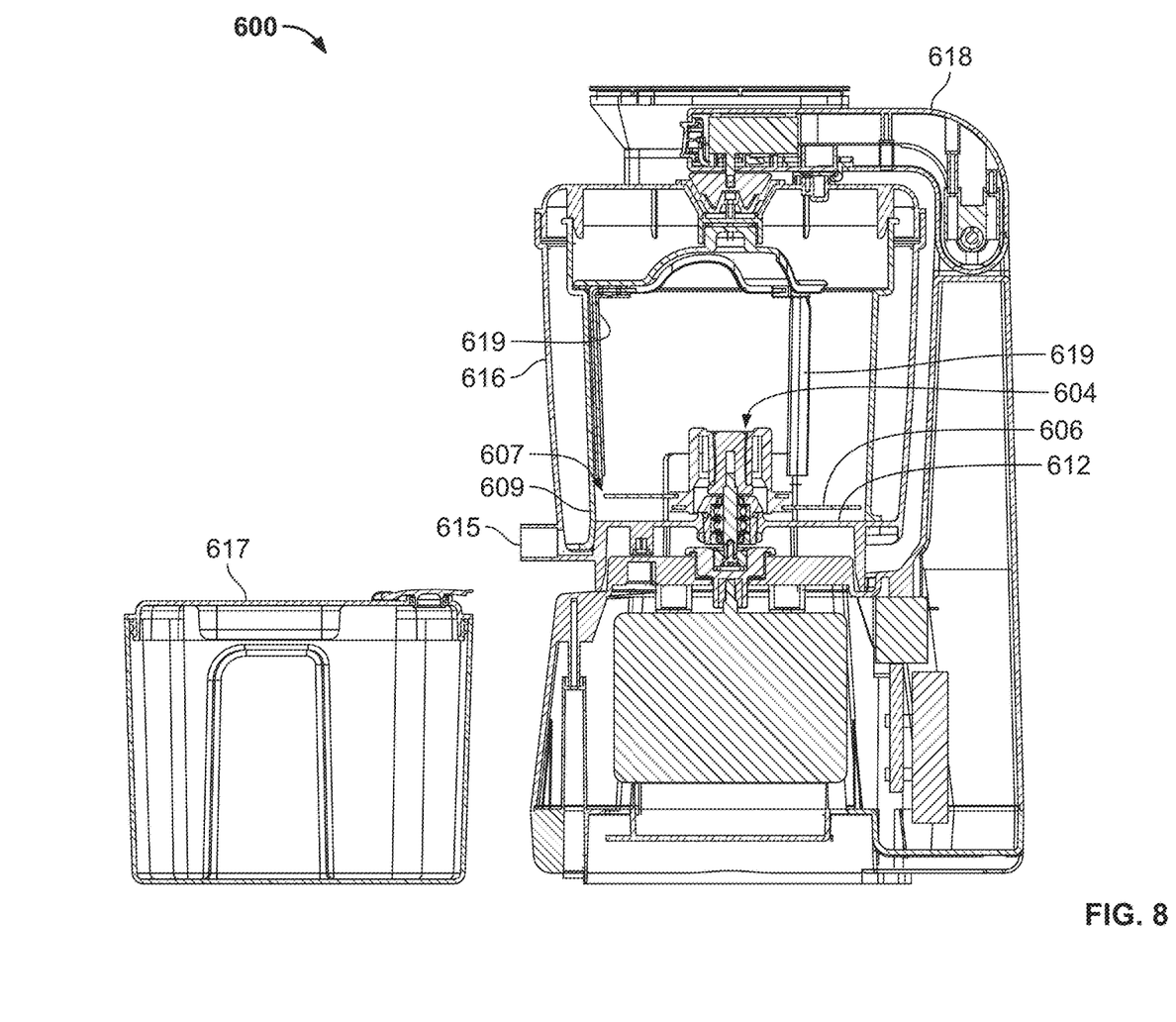
FIG. 8 is a side cross-sectional view of the nut milk device of FIG. 6.
Figure 9:
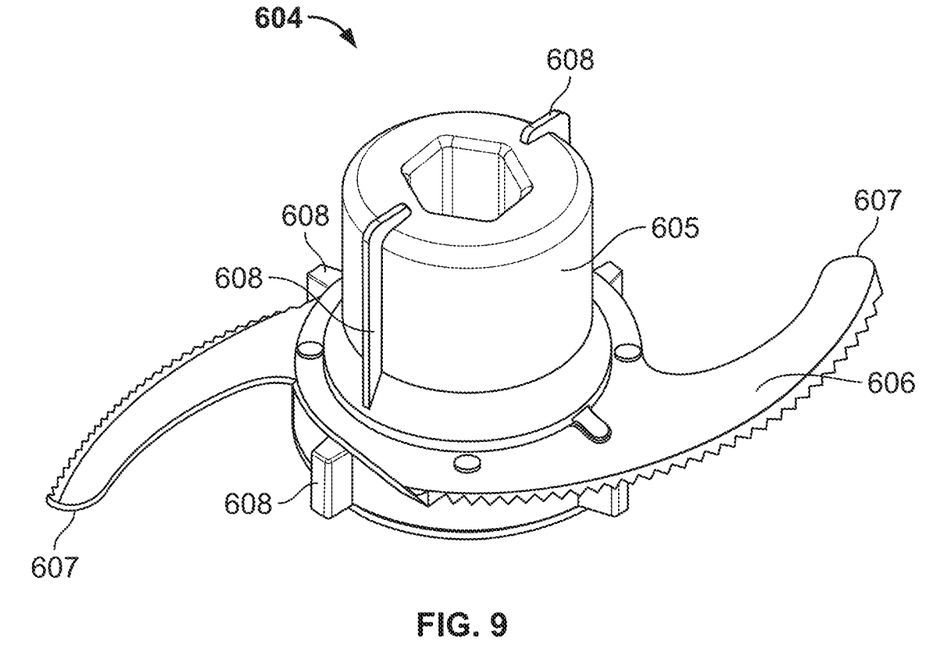
FIG. 9 is a perspective view of the cutting device of the nut milk device of FIG. 6.

The mixing container 609 is positioned within an outer container 616. In depicted embodiment, the mixing container 609 is sized to hold the total amount of nut butter and water that will be used to make a desired amount of nut milk. For example, the mixing container 609 has a volume large enough to produce about 2 L or so (about ½ gallon) of nut milk in one use. Of course, the device may be sized for smaller or larger production capacities as well. It is also conceivable that the mixing container may be sized to hold only a portion of the ingredients—for instance if some water was instead configured to flow into the gap between the outer container and mixing container—and still fall within the scope and spirit of the present disclosure. However, as described in more detail below, such conceptions may not emulsify the water and nut butter as efficiently during mixing as the depicted embodiment. The nut milk maker 600 also includes at least one screen 614 arranged on the sidewalls 610, 611 of the mixing container 609. The at least one screen 614 has holes sized to prevent non-emulsified nut butter (if any) and nuts/skin pieces from passing through to the gap between the mixing container 609 and outer inner container 616, but also sized to allow the emulsified nut milk to drain through. For instance, the at least one screen 614 may be 100 mesh size (0.0059 inch or 0.149 mm diameter openings). In the depicted embodiment, each screen 614 is approximately 75 mm wide by 40 mm tall (about 2.95 by 1.57 inches).

The depicted nut milk maker 600 further comprises a mixer 618 which extends up from the base 601 and terminates above the mixing container 609. The mixer 618 introduces one or more mixing arms 619 into the mixing container 609. The mixing arms 619 are configured to scrape nut pieces and/or nut butter from the inner sidewalls 610 of the mixing container 609 during the nut butter making step. In this way, the mixing arms 619 may knock any butter/pieces from the upper portions of the inner sidewalls 610 back toward the blades 606. Further, the mixing arms 619 may be actuated during the nut milk making step to assist in the blending of the nut butter with the water. It should be appreciated that adequate clearance is provided between the mixing arms 619 and the region of the sidewalls 610 occupied by the blades 606. In some embodiments, the sidewalls 610 of the mixing container 609 may even be inverted so that gravity draws the nuts and butter back towards the blades 606, and no mixing arms 619 are provided.

In operation of this embodiment, a user may insert the nuts into the mixing container 609 through an opening in the lid 613 and the nut milk maker 600 is turned on until the nuts are sufficiently buttered by the action of the blades 606, as well as the secondary contribution from the mixing arms 619 and the ribs 608 of the central hub 605. Of course, in other embodiments, the lid 613 may not have a separate opening and the entire lid may simply be removed to add nuts and then replaced thereafter. As described above, the nut buttering time may vary from a couple minutes to almost 20 minutes, depending on at least the type of nut, hardness and moisture content. Nonetheless, the arrangement of the blades, central hub, mixing container, and mixing arms of the present disclosure provide for an efficient and substantially complete pulverization of nuts into nut butter as compared to the known devices. Of course, a user can stop after the buttering step if only the nut butter is desired, without continuing further in the process of making nut milk. In such cases, the present disclosure relates to a one-step method of making nut butter. Further, no added oil is required to facilitate the buttering process. For example, the device of the depicted embodiment can butter up to six cups of almonds. However, buttering time and motor strain may correspondingly increase as a user adds nuts, especially toward the upper limits, compared to the buttering time and motor strain experienced for a quantity of nuts typically used to make nut milk (e.g., about two cups nuts per eight cups water). Any limitation restricting the scope of the present disclosure to nut milk only is neither intended nor should such limitation be inferred.

In a second step of operation, where the user desired to make nut milk, water is added to the inner container 609 and the nut milk maker 600 is again run (e.g., one to two minutes) to emulsify the nut butter into the water. The spinning of the blades 606, ribs 608 of the central hub 605, and the mixing arms 619 may all contribute to the mixing process. At this point, the nut milk is ready and a pour spout 615 may be provided on the outer container 616 for emptying the finished nut milk into a storage container 617 or another vessel, as desired. The blades 606 and/or arms 619 may further be actuated to provide a centrifugal force for quicker draining. As discussed above, the duration of the butter-making step may vary depending on the type of nut, preparation (e.g., raw, toasted, roasted), and condition (e.g., moisture content). However, thorough mixing may only take 1-2 minutes according to the present disclosure. Further, there is no need to presoak the nuts in water for hours beforehand, as with conventional methods for making nut milk.

It should be appreciated that the mesh size and the length/width dimensions of the one or more screens 614 initially keeps the added water confined to the mixing container 609, since the nut butter blocks or "clogs" the screen until enough emulsification thereof has occurred for the resulting nut milk to begin draining through. Concentration of the added water and nut butter together within the mixing container 609 facilitates the emulsification process, compared to previous devices where the water is free to move in between the mixing section and outer section (i.e. only a portion of the water is in contact with the nuts for mixing at any given time, potentially leading to longer mixing times and incomplete emulsification).

Figure 10:
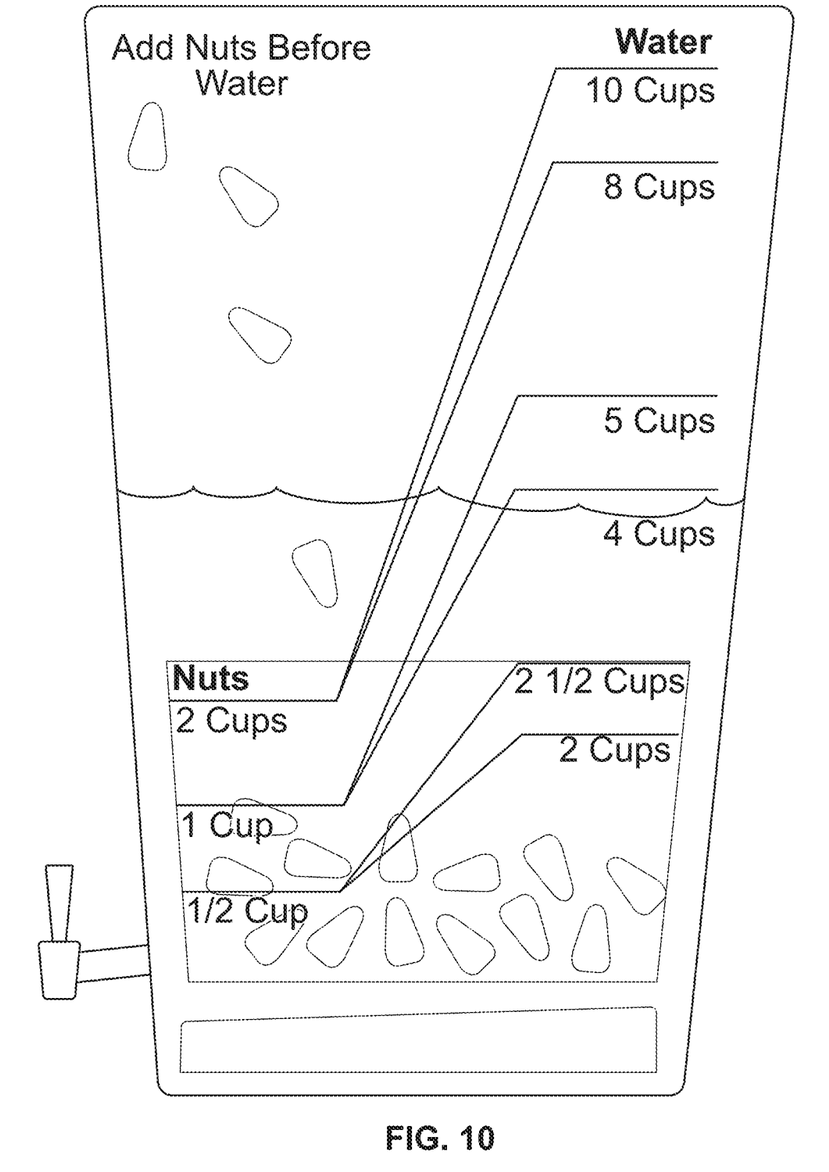
FIG. 10 shows an embodiment of container markings for a nut milk device according to the present disclosure.

As illustrated by FIG. 10, it may be advantageous to include markings on the container for any embodiment to assist users in adding the correct ratio of nuts to water.

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS

X00—nut milk maker
X01—base
X02—motor
X03—shaft
X04—cutting device
X05—central hub
X06—blades
X07—blade tips
X08—ribs
X09—mixing container
X10—inner sidewalls
X11—outer sidewalls
X12—bottom inner surface
X13—lid
X14—base plate/screen
X15—pour spout
X16—outer container
X17—storage container
X18—mixer
X19—mixing arms

The invention claimed is:

1. A method for producing nut and/or seed milks using a device, the device having a base with a motor, an outer container positioned above the base, and a mixing container positioned within the outer container, the method comprising the steps of:

adding a desired amount of nuts and/or seeds into the mixing container of the device, wherein the mixing container has inner sidewalls and a bottom surface, the inner sidewalls being substantially vertical;

activating a cutting device positioned within the mixing container between two and twenty minutes until the nuts and/or seeds are pulverized into a butter, the cutting device being driven by the motor, wherein the cutting device comprises a central hub and at least two blades, the at least two blades are vertically offset and each have a blade tip, each blade tip is positioned a radial distance from the inner sidewalls of the mixing container, the radial distance between the inner sidewalls and each blade tip is approximately 2.29 to 2.79 mm (0.09 to 0.11 inches), and a bottom blade of the at least two blades is spaced approximately 1.02 to 1.78 mm (0.04 to 0.07 inches) from the bottom surface of the mixing container;

adding a liquid to the mixing container after the step of pulverizing the nuts and/or seeds into the butter, wherein the mixing container has at least one screen arranged in the inner sidewalls thereof, the at least one screen having a plurality of holes which are initially clogged by the butter which prevents the liquid from exiting the mixing container through the at least one screen when the liquid is added to the mixing container;

activating the cutting device for one to three minutes until the butter and the liquid are emulsified into a milk, wherein the plurality of holes of the at least one screen are sized just large enough to allow the milk to freely pass therethrough; and draining the milk through a pour spout arranged on the outer container, whereby the milk inside the mixing container passes through the at least one screen into the outer container and then out of the outer container through the pour spout.

2. The method of claim 1, wherein the nuts and/or seeds are raw, roasted, and/or toasted and need not be presoaked beforehand, and wherein oil need not be added.

3. The method of claim 1, wherein during the step of pulverizing the nuts and/or seeds into the butter, one or more mixing arms arranged within the mixing container scrape the inner sidewalls of the mixing container.

4. The method of claim 1, wherein during the step of emulsifying the butter in the liquid to form the milk, one or more mixing arms arranged within the mixing container scrape the inner sidewalls of the mixing container.

5. The method of claim 1, wherein during the steps of pulverizing the nuts and/or seeds into the butter and emulsifying the butter in the liquid to form the milk, one or more mixing arms arranged within the mixing container scrape the inner sidewalls of the mixing container.

6. The method of claim 1, wherein the radial distance between the inner sidewalls and each blade tip is approximately 2.54 mm (0.10 inches).

7. The method of claim 1, wherein the plurality of holes of the at least one screen are approximately 100 mesh.

8. The method of claim 1, wherein the at least one screen is two screens, each screen being approximately 75 mm by 40 mm (2.95 by 1.57 inches).

9. The method of claim 1, wherein the at least one screen forms a majority of the inner sidewalls of the mixing container.

10. The method of claim 1, wherein the central hub of the cutting device comprises radially-extending ribs.

11. A method for producing nut and/or seed milks using a device, the device having a base with a motor, an outer container positioned above the base, and a mixing container positioned within the outer container, the steps of the method consisting of:

adding a desired amount of nuts and/or seeds into the mixing container of the device, wherein the mixing container has inner sidewalls and a bottom surface, the inner sidewalls being substantially vertical;

activating a cutting device positioned within the mixing container between two and twenty minutes until the nuts and/or seeds are pulverized into a butter, the cutting device being driven by the motor, wherein the cutting device comprises a central hub and at least two blades, the at least two blades are vertically offset and each have a blade tip, each blade tip is positioned a radial distance from the inner sidewalls of the mixing container, the radial distance between the inner sidewalls and each blade tip is approximately 2.29 to 2.79 mm (0.09 to 0.11 inches), and a bottom blade of the at least two blades is spaced approximately 1.02 to 1.78 mm (0.04 to 0.07 inches) from the bottom surface of the mixing container;

adding a liquid to the mixing container after the step of pulverizing the nuts and/or seeds into the butter, wherein the mixing container has at least one screen arranged in the inner sidewalls thereof, the at least one screen having a plurality of holes which are initially clogged by the butter which prevents the liquid from exiting the mixing container through the at least one screen when the liquid is added to the mixing container;

activating the cutting device for one to three minutes until the butter and the liquid are emulsified into a milk, wherein the plurality of holes of the at least one screen are sized just large enough to allow the milk to freely pass therethrough; and draining the milk through a pour spout arranged on the outer container, whereby the milk inside the mixing container passes through the at least one screen into the outer container and then out of the outer container through the pour spout.

12. The method of claim 11, wherein the nuts and/or seeds are raw, roasted, and/or toasted and need not be presoaked beforehand, and wherein oil need not be added.

13. The method of claim 11, wherein during the step of pulverizing the nuts and/or seeds into the butter, one or more mixing arms arranged within the mixing container scrape the inner sidewalls of the mixing container.

14. The method of claim 11, wherein during the step of emulsifying the butter in the liquid to form the milk, one or more mixing arms arranged within the mixing container scrape the inner sidewalls of the mixing container.

15. The method of claim 11, wherein during the steps of pulverizing the nuts and/or seeds into the butter and emulsifying the butter in the liquid to form the milk, one or more mixing arms arranged within the mixing container scrape the inner sidewalls of the mixing container.

16. The method of claim 11, wherein the radial distance between the inner sidewalls and each blade tip is approximately 2.54 mm (0.10 inches).

17. The method of claim 11, wherein the plurality of holes of the at least one screen are approximately 100 mesh.

18. The method of claim 11, wherein the at least one screen is two screens, each screen being approximately 75 mm by 40 mm (2.95 by 1.57 inches).

19. The method of claim 11, wherein the at least one screen forms a majority of the inner sidewalls of the mixing container.

20. The method of claim 11, wherein the central hub of the cutting device comprises radially-extending ribs.

\* \* \* \* \*